May 23, 1967  J. ANDERSON  3,320,650
METHOD OF CUTTER BAR MANUFACTURE
Filed March 13, 1964  2 Sheets-Sheet 2

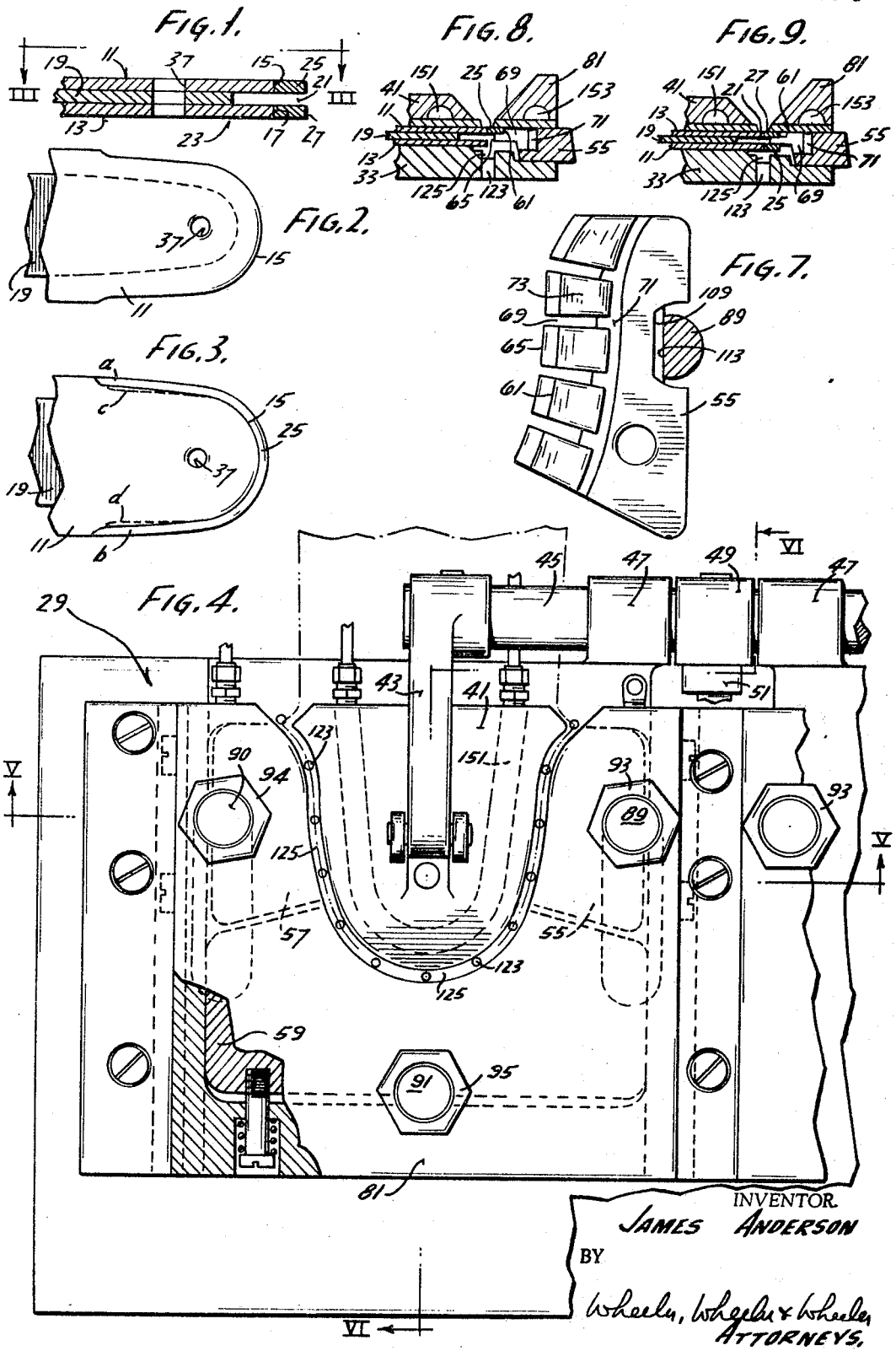

INVENTOR.
JAMES ANDERSON
BY
Wheeler, Wheeler & Wheeler
ATTORNEYS.

United States Patent Office 3,320,650
Patented May 23, 1967

3,320,650
METHOD OF CUTTER BAR MANUFACTURE
James Anderson, Beaconsfield, Quebec, Canada, assignor to Outboard Marine Corporation, Waukegan, Ill., a corporation of Delaware
Filed Mar. 13, 1964, Ser. No. 351,755
6 Claims. (Cl. 29—471.7)

The invention relates generally to cutter bars for chain saws and to methods of manufacturing such cutter bars.

Recent developments in the field of cutter bar fabrication have included techniques for welding preformed strips of wear-resistant, non-ferrous material to the rounded end portions of the periphery of a pair of plates. Subsequently, the plates were united to locate the wear-resistant strips in generally aligned and spaced relation to each other to provide a cutter bar having a track including a peripheral groove or slot for guiding the travel of a saw chain.

The invention disclosed herein provides for the application of the wear-resistant strips to the plates after the plates have been united. The invention also provides for cooling of the components being welded in an area adjacent to the zone of welding to restrict or limit the area of fusion created by the welding operation. In addition, the invention provides for conducting the welding operation in an envelope or atmosphere of inert gas which is supplied simultaneously to both sides of the area of fusion or weld joint. Still further, the invention provides for applying pressure, during welding, against the wear-resistant strips in a direction toward the adjacent rounded end portions to provide intimate engagement of such strips to the peripheries of the associated plates and to prevent sagging of the relatively molten metal.

The invention also provides for fabricating the strips with end portions which are spaced from each other at a distance slightly less than corresponding parts of the rounded end portions of the plates, and for frictionally assembling the strips to the plates by releasably spreading the end portions of the strips, locating the strips thus spread around the rounded end portions of the plates, and releasing the spread condition of the strips.

Other objects and advantages will become known by reference to the following description and accompanying drawings in which FIGURE 1 is a fragmentary sectional view of a cutter bar in accordance with the invention;

FIGURE 2 is a plan view taken along line 3—3 of FIGURE 1 prior to assembly thereon of the wear-resistant strips;

FIGURE 3 is a plan view taken along line 3—3 of the completed cutter bar;

FIGURE 4 is a fragmentary plan view of the fixture in which the strips are welded to the plates;

FIGURE 7 is an enlarged plan view of one of the clamps or guides incorporated in the fixture shown in FIGURE 4;

FIGURE 8 is a fragmentary sectional view showing clamping of the cutter bar during welding of the first strip; and FIGURE 9 is a fragmentary sectional view similar to FIGURE 8 illustrating the position of the cutter bar in the fixture during welding of the second strip to the cutter bar.

Figure 5:
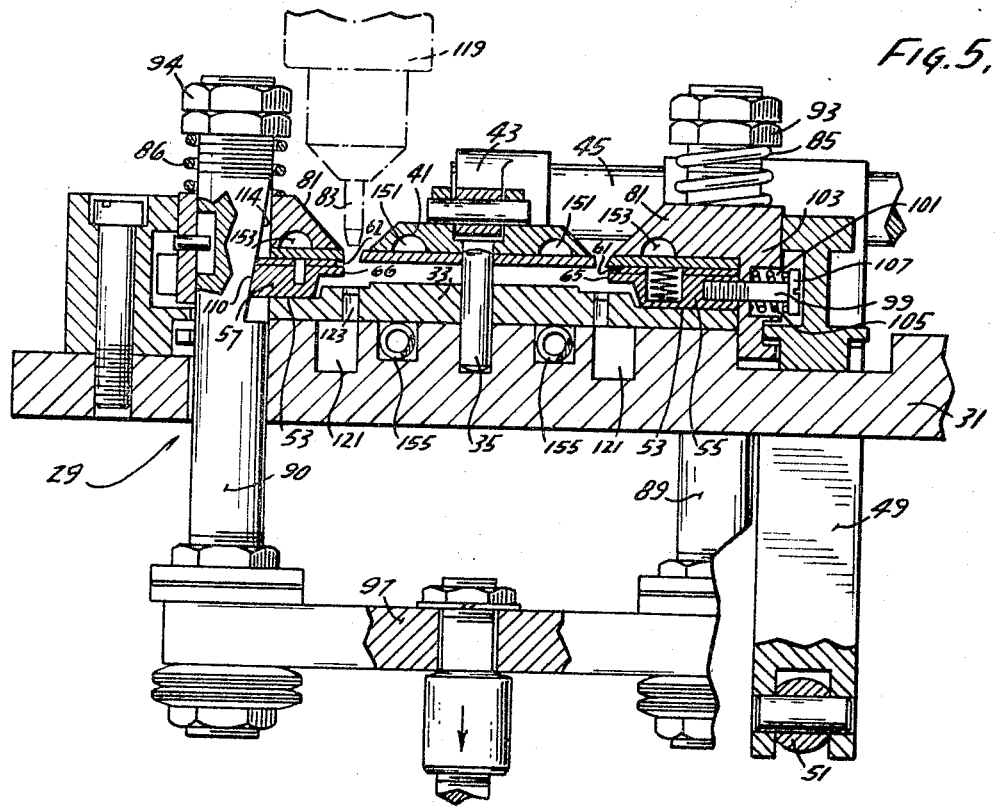
FIGURE 5 is a fragmentary sectional view taken along line 5—5 of FIGURE 4.

A pair of generally identical plates 11 and 13, each respectively having a rounded end or nose portions 15 and 17, are initially fabricated of steel in any conventional manner. In the preferred practice of the invention, a third plate 19, which is slightly smaller than the plates 11 and 13, but of generally similar contour, is also prefabricated in any conventional manner, the third plate 19 is intermediately disposed between the plates 11 and 13 to locate their peripheries in spaced relation to each other so as to define a groove 21 therebetween for guidance of a saw chain.

Also initially fabricated are a pair of generally identical strips of wear-resistant material, each having a contour corresponding to that of the rounded nose portions of the plates. The material sold under the trademark "Stellite" by the Haynes Stellite Co., and more specifically identified in United States application Ser. No. 178,442, now U.S. Patent No. 3,241,228, is one example of such a wear-resistant material.

After interposition of the third plate 19 between the plates 11 and 13 so as to define the groove 21, the plates 11, 13, and 19 are brazed together to form a unitary assembly 23. After brazing the assembly 23 is stress relieved by heat treating. Various other arrangements are known for fabricating an assembly with a peripheral groove similar to the assembly 23 with the groove 21. While the use of a brazed assembly is preferred, in its broadest sense, the invention is not limited to such an assembly.

After completion of the assembly 23, respective strips 25 and 27 of wear-resistant material are welded to the nose portions 15 and 17 of the plates 11 and 13. In the preferred practice of the invention, the welding takes place in an inert atmosphere during the application against the strips 25 and 27 of pressure directed inwardly toward the rounded nose portions, while heat is removed from areas adjacent the weld or fusion area so as to localize and confine the area or zone of fusion. In the preferred practice, the strips 25 and 27 are sequentially welded to the respective plates 11 and 13. However, in its broadest scope, the invention contemplates concurrent welding of both strips 25 and 27 to the respective plates 11 and 13.

The strips 25 and 27 can be fused or welded to the plates 11 and 13 in accordance with the preferred practice in the fixture 29 shown in FIGURES 4 through 9.

Figure 6:
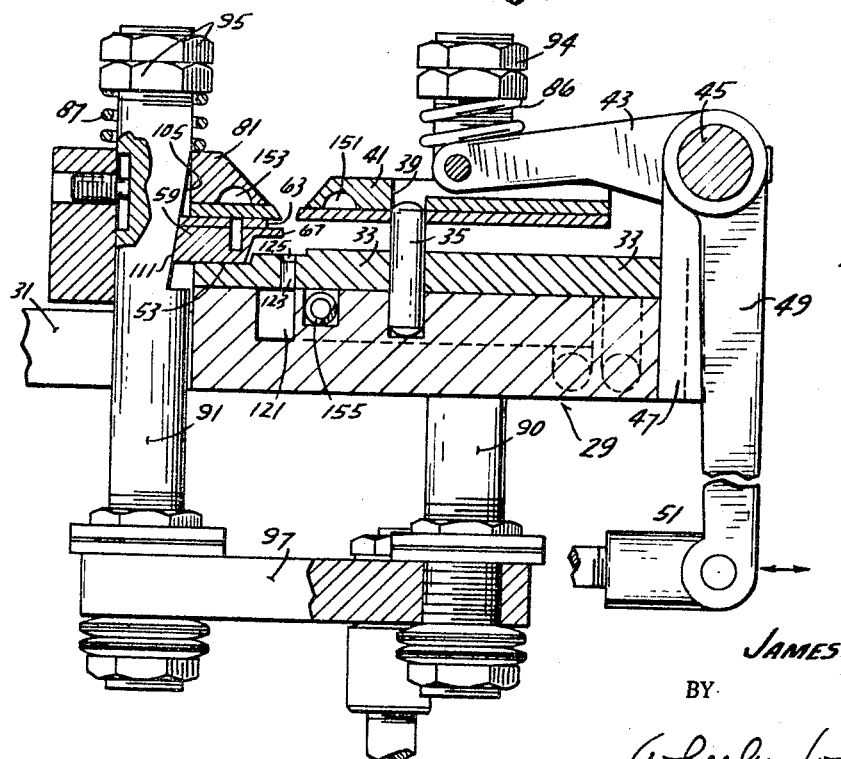
FIGURE 6 is a fragmentary sectional view taken along line 6—6 of FIGURE 4.

The fixture 29 includes, as seen best in FIGURES 5 and 6, a base 31 having a raised bed portion 33 onto which the completed assembly 23 is receivable. Extending upwardly, centrally of the bed portion 33, is a pilot 35 which passes through a mating hole 37 in the nose portion of the completed assembly 23 and through a mating hole 39 in a clamp plate 41.

The clamp plate 41 has a contour corresponding to, but slightly smaller than, that of the nose portions 15 and 17 and is carried by a clamp arm 43 keyed to a shaft 45 which is rotatably supported in a bracket 47 fixed to the base 31. The shaft 45 is rocked by a lever 49 to engage the clamp plate 41 against the completed assembly 23, thereby clamping the assembly 23 between the plate 41 and the bed portion 33. In turn, the lever 49 is pivotally connected to an arcuating rod 51 which is powered by any suitable device, as for instance, a pneumatic or hydraulic ram (not shown).

Surrounding the bed portion 33 of the base 31 is a platform 53 on which three clamps or guides 55, 57, and 59 (see FIGURE 4) are slideably mounted. The guides 55 and 57 are identical except for being left and right handed, and respectively include edges 61 and 62 (see FIGURE 5) having contours corresponding to that of the outer end edges of the strips 25 and 27. The guide 59 includes a generally U-shaped edge 63 (see FIGURE 6) which conforms generally to the contour of the outer edge of the central part of the strips 25 and 27. The edges 61, 62, and 63 are adapted to engage the outer surfaces of the strips and to apply thereto forces directed radially inwardly with respect to the pilot 35. The edges are formed inwardly of the ends of respective projections 65, 66, and 67 which are designed to overly the peripheral margin of the bed portion 33 of the base when the guides 55, 57, and 59 are slideably received on the platform 53. In addition, the projections 65, 66, and 67 underlie the respective edges 61, 62, and 63, projecting therefrom toward the bed portion 33, and serve to support the undersurface of the strip being welded. Each of the edges 61, 62, and 63 and the projections 65, 66, and 67 is, with respect to the pilot 35, radially segmented or slotted, as indicated at 69 in FIGURE 7, so that each edge and lip is formed by a series of fingers 73. In addition, the upper surface of each of the clamps 55, 57, and 59 is provided with respective arcuate troughs 71 which communicate with the slots 69.

Retaining the guides 55, 57, and 59 on the platform 53 is a U-shaped plate 81 having a contour generally corresponding to that of the clamp plate, but of larger dimensions to permit movement therebetween of a welding tip or electrode 83 (see FIGURE 5). The plate 81 is urged toward the base 31 by helical springs 85, 86, and 87 which respectively surround posts 89, 90, and 91 and are confined between the plate 81 and respective heads in the form of lock nuts 93, 94, and 95 threaded respectively at the top of the posts 89, 90, and 91.

The three posts or bolts 89, 90, and 91 extend through the plate 81 and the base 31 and, at their lower ends, are joined to a common power plate 97. As a result, the springs also serve to bias the posts 89, 90, and 91 upwardly with respect to the base 31.

The clamps 55, 57, and 59 are each guided and normally biased for sliding movement on the platform 53 in a direction away from the bed portion 33 by means including headed rods 99 (see FIGURE 5) which are threadedly engaged in the respective clamps and which extend through respective pockets 101 in a downwardly extending U-shaped skirt 103 extending from the plate 81. The pockets 101 serve to house helical springs 105 seated between the pocket inner ends and the heads 107 of the rods 99.

The clamps 55, 57, and 59 are urged toward the bed portion 33 to apply inwardly directed pressure to the strip in opposition to the action of the springs 105 by respective interaction between the clamps 55, 57, and 59 and the posts 89, 90, and 91 in response to movement of the posts downwardly relative to the base 31. In this regard, the clamps 55, 57, and 59 respectively include inclined camming edges 109 (see FIGURE 7), 110 (see FIGURE 5), and 111 (see FIGURE 6) engaged by respective co-operating inclined camming notches 113 (see FIGURE 7), 114 (see FIGURE 5), and 115 (see FIGURE 6) formed in the respective posts 89, 90, and 91. The camming edges and notches are designed to effect movement of the clamps along the platform 53 and toward the bed portion 33 in response to downward movement of the posts against the action of the helical springs 85, 86, and 87. Any suitable means can be employed to apply force to the power plate to effect such downward post movement and accompanying inward movement of the guides or clamps and accompanying application of pressure to the strips.

Envelopment of the zone of fusion or weld zone in an atmosphere of inert gas, such as argon, is provided by a welding device including means 119 for supplying inert gas at the welding tip 83 and by employment of a conduit or passage 121 in the base 31 which communicates with a source of inert gas and with a series of apertures 123 connected with a shallow trough or groove 125 immediately underlying the zone of fusion. Supply of an inert gas to the bottom of the weld zone serves to enhance weld penetration and also has a cooling effect, helping to maintain a narrow weld zone.

Respectively provided in the clamp plate 41, in the plate 81, and in the base 31 are coolant passages 151, 153, and 155 which are suitably connected to a source of coolant and which serve to confine the heat which produces the weld in a relatively small area, thereby limiting the width of the weld or fusion zone. Consequently, the grain structure along the outer peripheral edge of the strips is not adversely affected by the welding operation. Removal of heat from the plates and the strips by coolant in the passages also serves to more rapidly effect solidification of the molten metal behind the traveling welding tip 83.

In the practice of the method, the strips 25 and 27 are initially fabricated so that their end portions a and b (see FIGURE 3) are spaced from each other by an amount slightly less than the width of the corresponding parts of the plates 11 and 13, as indicated at c and d in dotted outline in FIGURE 3. Subsequently, after the plates have been brazed and heat treated, the ends of the strip 25 are slightly spread apart and the strip 25 is assembled to the plate 11, the strip and plate assembly being retained in assembled relation by reason of the frictional grip of the strip 25 on the edge of the plate. When the posts 89, 90, and 91 are in their elevated positions, and the guides 55, 57, and 59 are withdrawn, the brazed assembly 23, with the frictionally retained strip 25, is inserted over the pilot 35 and clamped to the bed portion 33 by the clamp plate 51, thereby locating the strip 25 of wear-resistant material on the projections 65, 66, and 67 of the clamps 55, 57, and 59 as shown in FIGURE 8.

Downward force is then applied to the power plate to urge the clamps 55, 57, and 59 toward the nose portion of the plate 11, thereby applying inwardly directed pressure against the strip 25 to insure intimate contact with the nose portion 15 of the plate 11. Assuming the coolant is flowing through the passages 151, 153, and 155, and that inert gas is being discharged into the passage 121 and is flowing into the trough or groove 125, the welding tip 83 is then actuated to provide a flow of inert gas at the top surface of the weld zone and to effect progressive welding of the strip 25 to the plate 11 along the periphery of the nose portion 15.

After completion of the welding of the strip 25 to the plate 11, the clamps 55, 57, 59, and 41 are released, the assembly 23 is withdrawn, and the strip 27 is frictionally assembled to the plate 13 in like manner to the frictional assembly of the strip 25 with the plate 11. The assembly 23 with the welded strip 25 and the frictionally retained strip 27 is then placed in inverted position on the bed portion 33 with the undersurface of the strip 27 supportingly engaged on the projections 65, 66, and 67 which extend into the groove 21 between the strips, as shown in FIGURE 9. The welding process is then repeated. During welding of the second strip 27, the inert gas issuing from the passage 121 and through the apertures 123 flows under and around the strip 25, into the slots 69 between the fingers 73, and from the slots 69 into the groove 21 in the area immediately under the welding zone.

After the strips 25 and 27 have been fused to the plates 11 and 13, the then completed assembly is preferably stress relieved at a temperature of about 1,100 degrees Fahrenheit for a period of about ten minutes and then allowed to cool at room temperature.

Various of the features of the invention are set forth in the following claims.

What is claimed is:

1. A method of manufacturing a chain saw bar comprising a pair of spaced, opposed plates each having a rounded end with a marginal strip of wear-resistant nonferrous material, said method comprising the steps of fabricating each of the pair of opposed plates with the rounded end, fabricating each of the strips of wear-resistant, non-ferrous material in a generally U-shape with end portions spaced from each other at a distance slightly less than the distance across a corresponding part of the rounded ends of the plates, securing the pair of plates to each other in spaced, apart, opposed relation with the rounded ends thereof in registry with each other, releasably spreading the end portions of one of the strips, placing the one strip, while maintaining the end portions thereof in spaced condition, around the rounded end of one of the plates, releasing the end portions of the one strip to frictionally assemble the one strip to the one plate, fusing the one strip to the one plate, releasably spreading the end portions of the other of the strips, placing the other strip, while maintaining the end portions thereof in spaced condition, around the rounded end of the other plate, releasing the end portions of the other strip to frictionally assemble the other strip to the other plate, and fusing the other strip to the other plate.

2. A method in accordance with claim 1 wherein said step of securing the plates to each other sequentially includes brazing the plates to each other and heat treating the assembled plates before said joining of the strips to the plates.

3. A method in accordance with claim 1 including the step of cooling either the plates or the strips during each of said fusings.

4. A method in accordance with claim 1 including the step of cooling both the plates and the strips during each of said fusings.

5. A method in accordance with claim 1 including the step of enveloping the strip and the plate in an inert atmosphere during each of said fusings, said enveloping step including supplying inert gas from an electrode disposed adjacent one edge of the joint being fused between the strip and the plate and simultaneously supplying inert gas to adjacent the opposed edge of the joint being fused between the strip and the plate.

6. A method according to claim 1 including the step of exerting pressure on the strip in a direction toward the rounded end of the plate during each of said fusings.

References Cited by the Examiner

UNITED STATES PATENTS

| | | | |
|---|---|---|---|
| 1,848,289 | 3/1932 | Wissler | 29—487 X |
| 1,917,901 | 7/1933 | Rohlfing | 29—487 X |
| 2,673,276 | 3/1954 | Allardt | 29—487 X |
| 2,862,294 | 12/1958 | Philip | 29—487 |
| 3,054,176 | 9/1962 | Beneke | 29—463 X |
| 3,196,538 | 9/1965 | Zachman | 29—487 |
| 3,241,228 | 3/1966 | Rayniak et al. | 29—475 |

JOHN F. CAMPBELL, *Primary Examiner.*

P. M. COHEN, *Assistant Examiner.*